(12) United States Patent
Lim

(10) Patent No.: US 8,120,805 B2
(45) Date of Patent: Feb. 21, 2012

(54) IMAGE FORMING APPARATUS TO SET PARAMETER CORRESPONDING TO DRIVER VERSION OF HOST DEVICE, HOST DEVICE, AND METHODS THEREOF

(75) Inventor: Young-kak Lim, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1104 days.

(21) Appl. No.: 11/954,152

(22) Filed: Dec. 11, 2007

(65) Prior Publication Data

US 2008/0158590 A1 Jul. 3, 2008

(30) Foreign Application Priority Data

Dec. 29, 2006 (KR) .......................... 10-2006-0138042

(51) Int. Cl.
*G06F 15/00* (2006.01)
*G06F 15/177* (2006.01)

(52) U.S. Cl. ...................................... 358/1.15; 709/222

(58) Field of Classification Search ................. 358/1.15, 358/1.13, 1.14, 1.9, 1.16, 1.18, 1.11; 709/222, 709/224, 206, 219, 238; 235/383, 380, 384; 400/62

See application file for complete search history.

(56) References Cited

FOREIGN PATENT DOCUMENTS

JP          07-137356      *  5/1995

* cited by examiner

*Primary Examiner* — Saeid Ebrahimi Dehkordy
(74) *Attorney, Agent, or Firm* — Stanzione & Kim, LLP

(57) ABSTRACT

A printing system includes an image forming apparatus and a host device. An image forming apparatus includes a printing part to perform a printing operation, a receiver to receive a parameter on a drive condition of the printing part from the host device, a storage part to store a parameter for each driver version, and a controller to update the stored parameter according to the received parameter. Accordingly, the quality of printing output can be improved by setting a parameter corresponding to a driver version of the host device and/or the satisfaction of and the convenience for a user can be improved by realizing a user desired/set color output.

23 Claims, 9 Drawing Sheets

IMAGE FORMING APPARATUS TO SET PARAMETER CORRESPONDING TO DRIVER VERSION OF HOST DEVICE, HOST DEVICE, AND METHODS THEREOF

CROSS-REFERENCE TO RELATED APPLICATIONS

This application claims priority under 35 U.S.C. §119(a) of Korean Patent Application No. 10-2006-0138042, filed on Dec. 29, 2006, in the Korean Intellectual Property Office, the disclosure of which is incorporated herein by reference in its entirety.

BACKGROUND OF THE INVENTION

1. Field of the Invention

The present general inventive concept relates to an image forming apparatus to set a parameter corresponding to a driver version, a host device, and methods thereof, and more particularly, to a host device to transmit a parameter on a printing drive condition to an image forming apparatus, an image forming apparatus to perform a printing operation using a parameter provided from a host device, and methods thereof.

2. Description of the Related Art

An image forming apparatus is an apparatus printing an image corresponding to an input file, which is to be printed, on a record medium such as a printing paper. For example, the image forming apparatus includes a printer, a copying machine, and a facsimile. Such an image forming apparatus may be connected to a host device such as a computer to constitute a printing system.

The host device includes a driver of the image forming apparatus or includes a plurality of drivers for driver versions. On the other hand, the image forming apparatus includes a firmware corresponding to the driver of the host device and controls a printing operation according to a parameter set in the firmware.

In the case in which the driver version of the host device is not the same as the firmware version of the image forming apparatus, the printing quality is deteriorated. More particularly, if the versions are not the same, the color of a printing object output from the image forming apparatus can be output differently from the color of an original file, which is to be printed. Further, in this case, the printing data may not be able to be read by the image forming apparatus, and an output having an error may be output.

In this case, whenever the driver version of the host device is updated, it is also necessary to update the firmware of the image forming apparatus.

In addition, in the case in which a user wants to change the color setting in the host device on the original file, which is to be printed, since the conversion is performed in the RGB color in a related art color changing method, a beginner has a difficulty in using the method.

SUMMARY OF THE INVENTION

The present general inventive concept provides a host device to transmit a parameter on a printing drive condition to an image forming apparatus, an image forming apparatus to perform a printing operation using a parameter provided from a host device, and methods thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a printing part to perform a printing operation, a receiver to receive a parameter on a drive condition of the printing part from a host device, a storage part to store a parameter for each driver version, and a controller to update the stored parameter according to the received parameter.

The image forming apparatus may further include a determiner that may determine whether a parameter corresponding to an updated driver version is stored in the storage part when information on the updated driver version of the host device is received through the receiver and the controller may receive a parameter for the updated driver version from the host device and may store the received parameter for the updated driver version in the storage part when the parameter corresponding to the updated driver version is determined not to exist as a result of the determination.

The image forming apparatus may further include a user interface part to select reception of the parameter corresponding to the updated driver version of the host device and the controller may demand the parameter from the host device and may store the parameter received responsive to the demand in the storage part when the reception of the parameter is selected through the user interface part.

The controller may confirm a driver version from printing data and may drive the printing part according to a parameter corresponding to the confirmed driver version when the printing data is received from the host device.

The image forming apparatus may further include a determiner to determine whether a parameter is included in printing data when the printing data is received from the host device and the printing part may be driven according to the included parameter when the parameter is determined to be included in the received printing data.

The parameter may be at least one of codes corresponding to transfer output voltage values, density regulation values, and amounts of consumed toner for C, M, Y, and K.

The foregoing and/or other aspects and utilities of the present general inventive concept may also be achieved by providing a host device including a driver of an image forming apparatus including a storage part to store a parameter corresponding to a driver version, and a controller to update the parameter corresponding to the driver version in the storage part when a driver is updated and transmit a parameter corresponding to the updated driver version to the image forming apparatus.

The controller may transmit update information to the image forming apparatus if the driver is updated and may transmit the parameter corresponding to the updated driver version to the image forming apparatus if reception of the parameter corresponding to the updated driver version is demanded from the image forming apparatus.

The host device may further include a user interface part to input a change value for color setting of printing data and the controller may transmit a parameter corresponding to the change value to the image forming apparatus when the change value is input through the user interface part.

The user interface part may provide a user interface window including a selection region providing density regulation ranges for C, M, Y, and K and a display region displaying a preview image of a printing output according to the change value when the change value is input in the selection region.

The parameter corresponding to the driver version may be at least one of codes corresponding to transfer output voltage values, density regulation values, and amounts of consumed toner for C, M, Y, and K.

The foregoing and/or other aspects and utilities of the present general inventive concept may also be achieved by providing a method of setting a parameter of an image forming apparatus, the method including receiving a parameter on a printing drive condition from a host device, changing and setting a preset parameter to the received parameter, and performing a printing operation according to the set parameter.

Receiving a parameter on a printing drive condition from a host device may include determining whether there is a parameter corresponding to an updated driver version in parameters prestored for driver versions if information on an update of a driver version is received from the host device, and receiving a parameter for the updated driver version from the host device when the parameter corresponding to the updated driver version in parameters is not prestored.

The method of setting a parameter may further include confirming a driver version from printing data when the printing data is received from the host device, and reading a parameter corresponding to the confirmed driver version in the parameters prestored for driver versions, and the printing operation may be performed according to the read parameter.

The parameter may be at least one of codes corresponding to transfer output voltage values, density regulation values, and amounts of consumed toner for C, M, Y, and K.

The foregoing and/or other aspects and utilities of the present general inventive concept may also be achieved by providing a method of transmitting a parameter of a host device connected to an image forming apparatus, the method including storing a parameter on a drive condition of the image forming apparatus for each driver version, and transmitting a parameter corresponding to an updated driver version to the image forming apparatus when a driver is updated.

The transmitting a parameter may include transmitting update information to the image forming apparatus, demanding reception of the parameter corresponding to the updated driver version by the image forming apparatus, and transmitting the parameter corresponding to the updated driver version to the image forming apparatus according to the demand.

The method may further include displaying a user interface window for selecting one of the stored driver versions, and producing printing data according to a selected driver version and transmitting the printing data to the image forming apparatus when the driver version is selected through the user interface window and a printing command is input.

The method may further include displaying a user interface window for inputting a change value for color setting of printing data, displaying a preview image of an output of the printing data according to the change value when the change value is input through the user interface window, and transmitting a parameter according to the change value to the image forming apparatus.

The user interface window may include a selection region providing density regulation ranges for C, M, Y, and K and a display region displaying a preview image of a printing output according to the change value when the change value is input in the selection region.

The parameter on the drive condition may be at least one of codes corresponding to transfer output voltage values, density regulation values, and amounts of consumed toner for C, M, Y, and K.

The foregoing and/or other aspects and utilities of the present general inventive concept may also be achieved by providing a printing system including a host device including a storage part to store a parameter corresponding to a driver version, and a controller to update the parameter corresponding to the driver version in the storage part when a driver is updated and to transmit the parameter corresponding to the updated driver version, and an image forming apparatus including a printing part to perform a printing operation, a receiver to receive the parameter on a drive condition of the printing part from the host device, a storage part to store another parameter for each driver version, and a controller to update the stored another parameter according to the received parameter.

The host device may automatically transmit the parameter when the controller updates the parameter corresponding to the driver version.

The image forming apparatus may transmit a signal when communicating with the host device, and the host device may transmit the parameter upon receiving the signal from the image forming apparatus.

The host device may include a user interface part to generate a user interface, and to receive data through the user interface according to the version condition, the controller of the host device may transmit the data and the parameter to the image forming apparatus, and the printing part of the image forming apparatus may perform the printing operation of printing an image on a printing medium according to the data and the updated parameter.

BRIEF DESCRIPTION OF THE DRAWINGS

These and/or other aspects and utilities of the present general inventive concept will become apparent and more readily appreciated from the following description of embodiments of the present general inventive concept, taken in conjunction with the accompanying drawings of which.

DETAILED DESCRIPTION OF EMBODIMENTS

Figure 1:
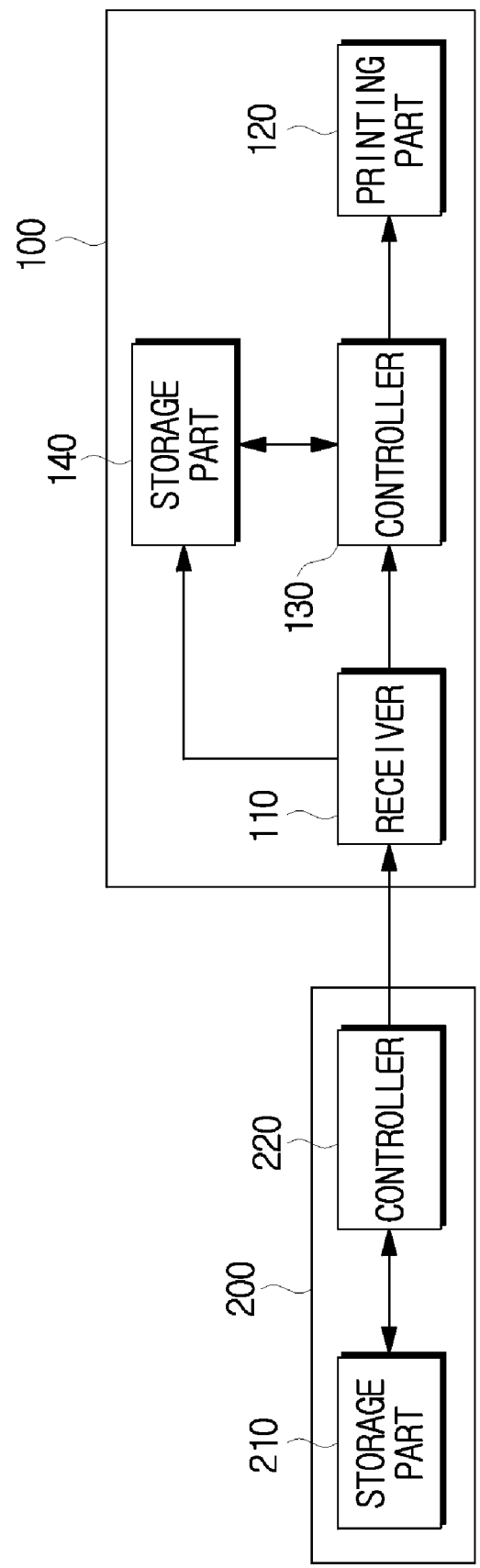
FIG. 1 is a block diagram illustrating an image forming apparatus according to an exemplary embodiment and a host device of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram illustrating an image forming apparatus 100 and a host device 200 according to an exemplary embodiment of the present general inventive concept. As illustrated in FIG. 1, the image forming apparatus 100 includes a receiver 110, a printing part 120, a controller 130, and a storage part 140. On the other hand, the image forming apparatus 100 may be connected to the host device 200 to perform data communication with the host device 200. As illustrated in FIG. 1, the host device 200 includes a storage part 210 and a controller 220. The image forming apparatus 100 and the host device 200 may constitute a printing system to form or print an image on a printing medium, or to transmit or receive data to be printed.

The receiver 110 of the image forming apparatus 100 may receive the data received from the host device 200. The received data may be printing data or option data on the printing data. For example, the printing data are data on an object to be actually printed and the option data are data setting options on the object to be actually printed.

The option data may be a parameter on the drive condition of the printing part 120. The parameter may be received together with the printing data or may be received by itself.

For example, the parameter may be a code value corresponding to transfer output voltage values, density regulation values, and amounts of consumed toner for C, M, Y, and K.

The printing part 120 performs a printing operation of the printing data received from the host device 200. The printing operation may be controlled according to the parameter value set by the controller 130.

The storage part 140 preferably stores a parameter for each driver version.

The controller 130 may update the stored parameter according to the received parameter.

On the other hand, the storage part 210 of the host device 200 stores the driver of the image forming apparatus 100.

If the stored driver is updated to a new version, the controller 220 may update the storage part 210 and transmit a parameter corresponding to the updated driver version to the image forming apparatus 100.

That is, in the case in which the driver of the image forming apparatus 100 is updated to a new version in the host device 200, the information on the changed parameter is transmitted to the image forming apparatus 100.

The controller 130 of the image forming apparatus 100 receives the transmitted parameter to update the storage part 140. The controller 130 can change and set the parameter preset in the printing part 120 to the received parameter.

Accordingly, the image forming apparatus 100 sets a parameter corresponding to the driver version of the host device 200.

Figure 2:
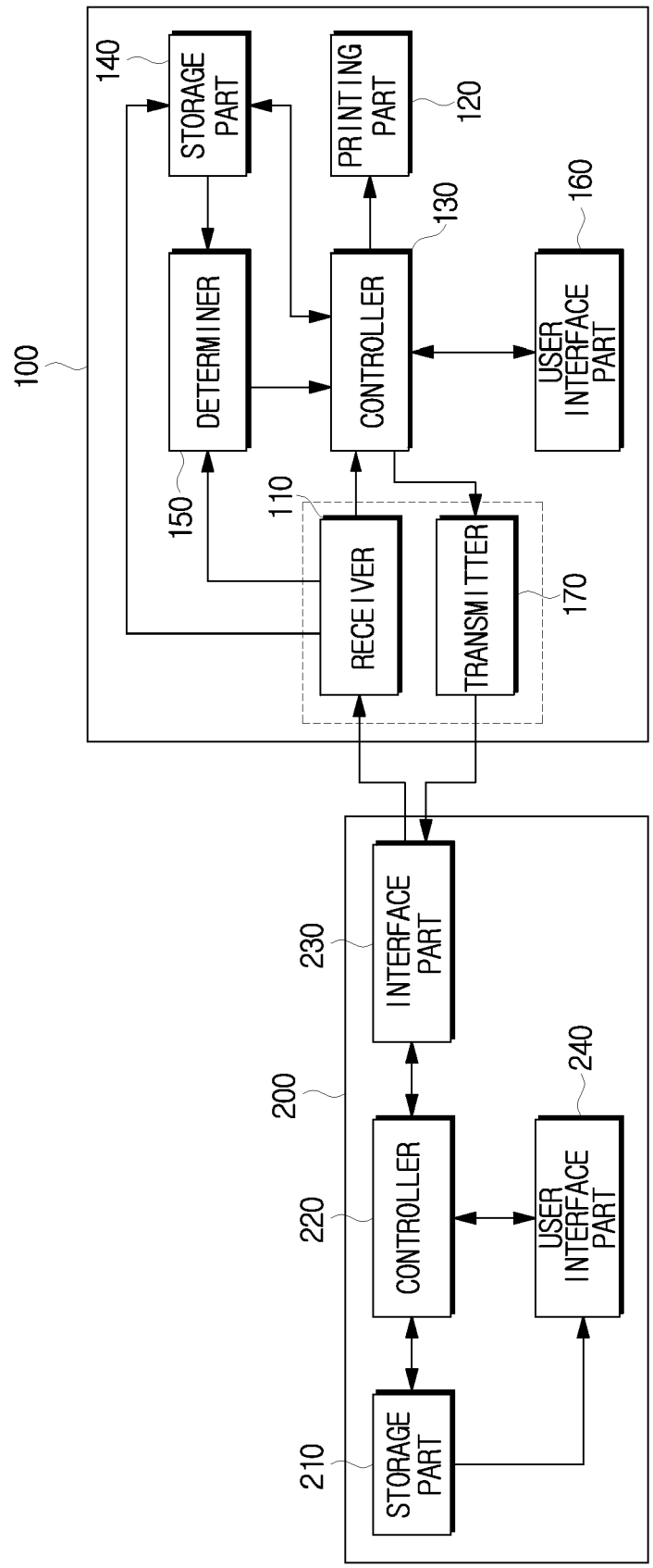
FIG. 2 is a block diagram illustrating the image forming apparatus and the host device of FIG. 1.

FIG. 2 is a block diagram illustrating the image forming apparatus and the host device of FIG. 1 in additional detail. As illustrated in FIG. 2, the image forming apparatus 100 may include a determiner 150, a user interface part 160, and a transmitter 170 in addition to elements of the image forming apparatus of FIG. 1. Further, the host device 200 coupled to the image forming apparatus 100 may include an interface part 230 and a user interface part 240 in addition to elements of the host device of FIG. 1.

The receiver 110 and the transmitter 170 are interfaces for performing data communication with the host device 200 and transmit and receive data to and from the interface part 230 of the host device 200. For example, the interfaces can be connected through USB ports, using a local area network (LAN) and the Internet network or the like.

If information on a driver update is received from the host device 200 through the receiver 110, the determiner 150 preferably determines whether a parameter corresponding to the updated driver version is stored in the storage part 140 or the like of the image forming apparatus 100.

A result of the determination whether the reception of the parameter corresponding to the driver version updated in the host device 100 may be input to the user interface part 160.

If the reception of the parameter is input from the user interface 160 to the controller 130, the controller 130 may demand reception of the parameter from the host device 200 through the transmitter 170 and store the parameter received according to the demand in the storage part 140. On the other hand, if the determiner 150 determines that there is not a parameter corresponding to the updated driver version, the controller 130 may receive a parameter through an automatic demand.

Alternatively, if printing data are received from the host device 200, the controller 130 may determine a parameter, which is to be set in the printing part 120, according to existence of a parameter on the printing data.

If the printing data are received from the host device 200, the controller 130 may temporarily store the printing data in the storage part 140 and confirm the driver version from the received printing data. On the other hand, the determiner 150 may determine whether a parameter is included in the stored printing data.

If the determiner 150 determines that a parameter is included in the stored printing data, the controller 130 preferably reads the parameter from the printing data. On the other hand, in the case in which only the printing data are transmitted, the controller 130 preferably reads a parameter corresponding to the confirmed driver version from the storage part 140.

Here, the printing data may be the data in the form including the option data on printing settings (e.g., condition of the printing part 120). Alternatively, in the case in which the printing data and the option data are received separately, it is determined whether the option data is a parameter.

The option data may be a parameter corresponding to a change value for color setting and may be a printing option on the paper size, the kind, the paper direction, and the number of papers of the printing data.

The controller 130 can drive the printing part 120 according to the read parameter. For example, if it is determined the parameter is included (e.g., in the printing data); the printing part 120 is driven by changing the preset parameter to the received parameter. Further, if no parameter is included in the printing data, the printing part 120 is driven using the read parameter. On the other hand, if the stored driver is updated, the controller 220 of the host device 200 may transmit the information on the update to the image forming apparatus 100. Further, if the reception of the parameter of the updated driver version is demanded from the image forming apparatus 100, the demanded parameter is transmitted to the image forming apparatus 100.

The storage part 210 may store a plurality of parameters with respect to representations of color or color elements such as Cyan-Magenta-Yellow-Black (C, M, Y, K) colors. That is, the parameters having different set values are stored. For example, in the case in which the number of stored parameters on C is 100, the first to $100^{th}$ parameters 1P to 100P are stored. In this case, the first parameter 1P may be a code value corresponding to the transfer output voltage value of 10 V, the density regulation value of 30, and the amount of consumed toner of 2%, and the second parameter 2P may be a code value corresponding to the transfer output voltage value of 12 V, the density regulation value of 35, and the amount of consumed toner of 4%. The parameters (e.g., 100 parameters) may be classified and stored for each color.

On the other hand, the plurality of parameters stored in the storage part 210 may include parameters corresponding to driver versions. Therefore, those of the plurality of parameters, which corresponds to the driver versions, are also classified and stored.

When inputting printing commands, the controller 220 can convert the RGB signal (e.g., first signal), which is a color signal of a file to be printed, to the CMYK signal (e.g., second signal), which is a color signal of the image forming apparatus. In the related art, when a color signal is changed, the RGB color is changed and then is converted to the CMYK color. However, in the embodiment of FIG. 2, the color is changed using a plurality of parameters stored with respect to the changed CMYK. A printing command and a change value on color setting of printing data are input at the user interface 240. Then, the change value may be one of a plurality of parameters stored in the storage part 210.

The user interface part 240 may provide a user interface window including a selection region providing density regulation ranges for C, M, Y, and K and a display region displaying a preview image of a printing output according to the change value if the change value is input in the selection region. An exemplary user interface will now be described in further detail with reference to FIG. 3.

Figure 3:
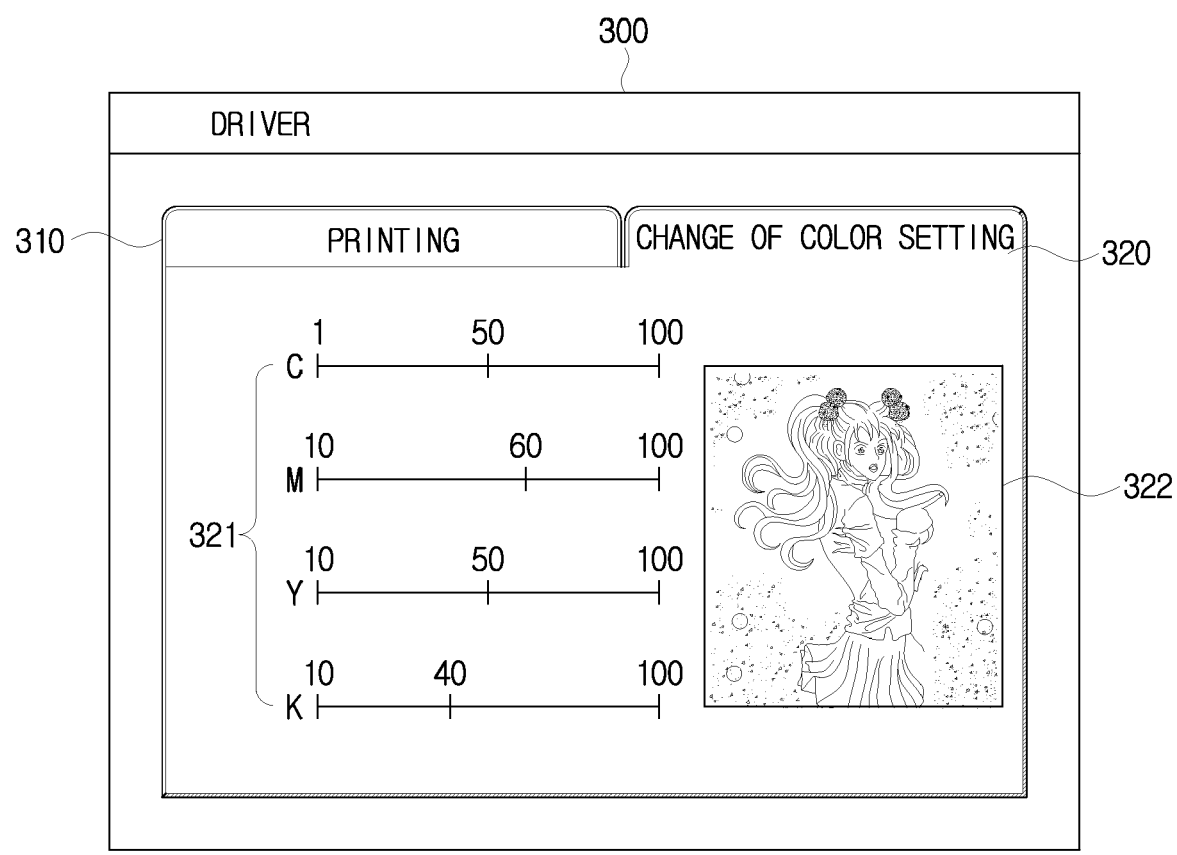
FIG. 3 is a diagram illustrating a user interface of a host device according to an exemplary embodiment of the present general inventive concept.

FIG. 3 is a diagram illustrating a user interface 300 of a host device according to an exemplary embodiment of the present general inventive concept. As illustrated in to FIG. 3, it can be seen that the user interface window 300 may be displayed by a driver. The user interface window 300 may be divided into and selected as a user interface window 310 for printing and a user interface window 320 for change of color setting. In FIG. 3, the user interface window 320 for change of color setting is selected.

As illustrated in FIG. 3, the user interface window 320 for change of color setting may be realized by a driver. However, the present general inventive concept is not intended to be limited by such an exemplary disclosure. For, example, the user interface window 320 may also be realized by a separate application program or the like.

As illustrated in FIG. 3, the user interface window 320 provides a selection region 321 that can provide density regulation ranges for C, M, Y, and K and a display region 322 may display a preview image of a printing output according to the change value if the change value is input in the selection region 321.

The display region 322 can display an output image on the printing data as the initial screen. However, the color of the image displayed on the display region 322 is preferably changed according to the selection of the change value of a user through the selection region 321.

Then, the density regulation range of the selection region 321 may be selected from 1 to 100. As illustrated in FIG. 3, it can be confirmed that the exemplary density regulation value for the C color is set to 50, for the M color, 60, for the Y color, 50 and for the K color, 40.

The controller 220 may also read one of the pluralities of parameters for the C, M, Y, and K, which corresponds to the selected change value, and transmit a corresponding parameter to the image forming apparatus 100.

For example, if a change value is input through the user interface 240, the controller 220 can transmit a parameter according to the change value to the image forming apparatus 100 and transmit only printing data if a change value is not input.

Since the user interface 300 may depend on a version of the driver of the host device 200, data for settings and selections corresponds to the version of the driver of the host device 200. Thus, data including the printing data and the setting and selection data may be generated according to the version of the driver of the host device 200. That is, when the version of the driver includes a first version and a second version, and when the driver of the host device 200 has the second version, the image forming apparatus 100 having the first version may not read or recognize the data generated according to the second version of the driver of the host device 200. According to the present embodiment, the image forming apparatus 100 can be updated according to the version of the driver of the host device 200.

Figure 4:
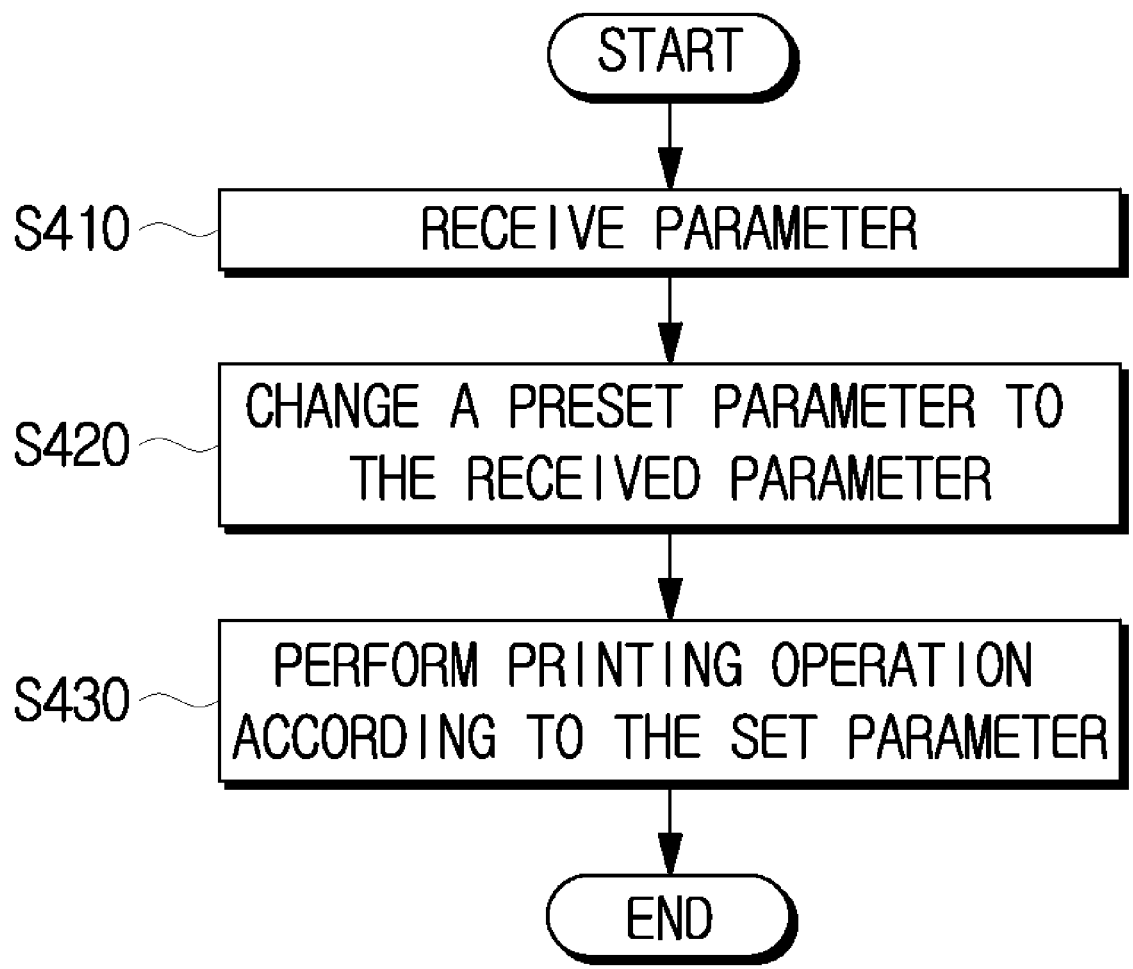
FIG. 4 is a flowchart illustrating a method of setting a parameter of an image forming apparatus according to an exemplary embodiment of the present general inventive concept.

FIG. 4 is a flowchart illustrating a method of setting a parameter of an image forming apparatus according to an exemplary embodiment of the present general inventive concept. As illustrated in FIG. 4, if a parameter on a printing drive condition is received from a host device at operation S410, a preset parameter may be changed and set to the received parameter at operation S420, and a printing operation is performed according to the set parameter at operation S430.

The parameter received from the host device may be a parameter corresponding to a driver version. Further, it may be a parameter changing the color setting of printing data (e.g., user color setting).

For example, the parameter may be one of codes corresponding to transfer output voltage values, density regulation values, and amounts of consumed toner for C, M, Y, and K.

Figure 5:
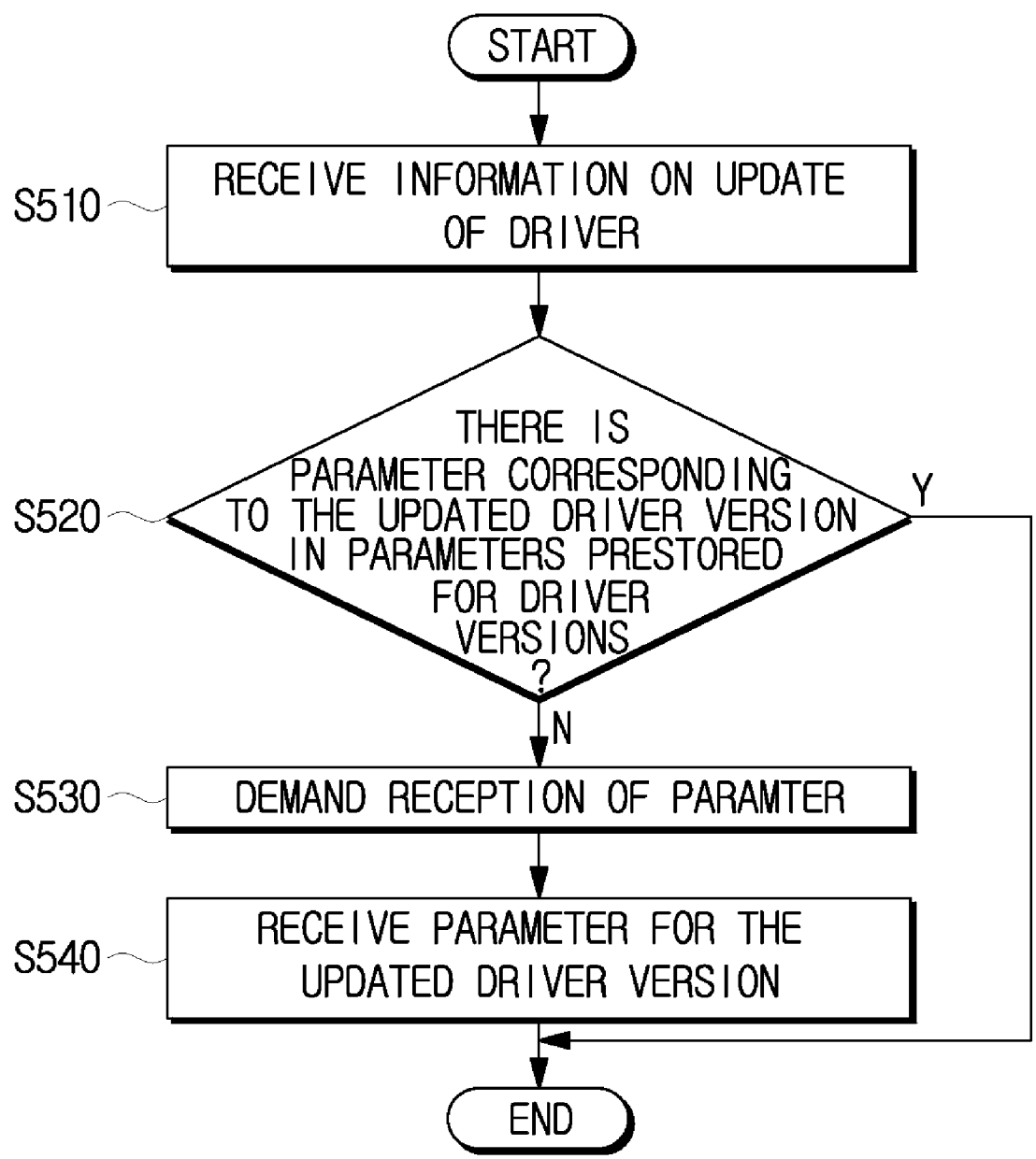
FIG. 5 is a flowchart illustrating a method of receiving a parameter from a host device.

FIG. 5 is a flowchart illustrating a method of receiving a parameter from a host device according to an exemplary embodiment of the present general inventive concept. Reception of a parameter as illustrated in FIG. 5 is preferably performed at operation S410 of FIG. 4. Referring to FIG. 5, if information on a driver update is received from a host device at operation S510, it can be confirmed whether there is a parameter corresponding to an updated driver version in the parameters prestored for driver versions at operation S520.

When is determined that there is not an updated parameter (e.g., at operation S520), reception of a parameter corresponding to the updated driver version may be demanded from the host device at operation S530. Then, the parameter corresponding to the updated driver version may be received at operation S540.

Figure 6:
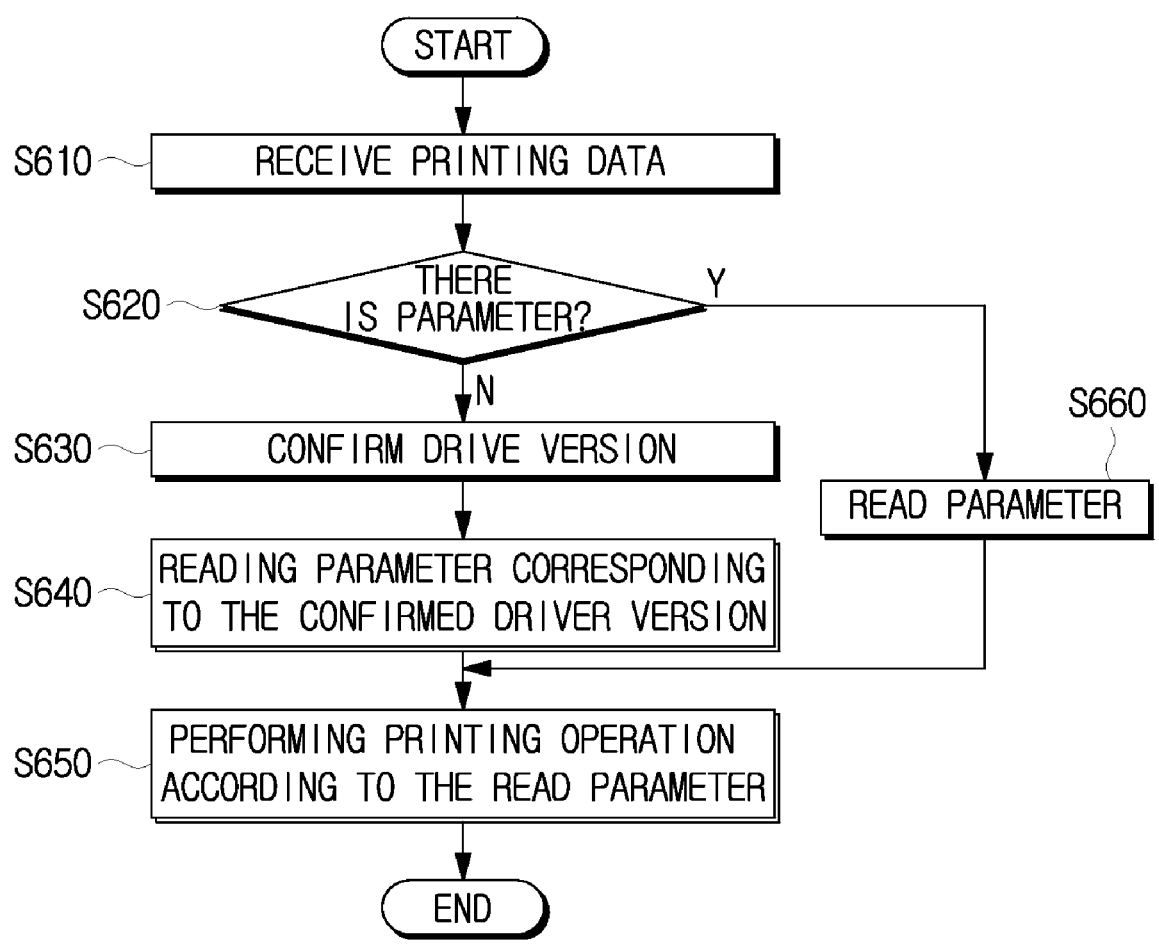
FIG. 6 is a flowchart illustrating a method of transmitting a parameter of an image forming apparatus according to another exemplary embodiment of the present general inventive concept.

FIG. 6 is a flowchart illustrating a method of setting a parameter of an image forming apparatus according to another exemplary embodiment of the present general inventive concept. As illustrated in FIG. 6, if printing data are received at operation S610, the printing data are temporarily stored (e.g., at image forming apparatus 100) to perform a printing operation. It can be determined whether a parameter is in the stored printing data at operation S620. On the other hand, it can be determined whether there is a parameter received as separate option data during the reception of the printing data at operation S620.

In the case in which there is no parameter, the driver version can be confirmed in the process of converting the printing data to image data at operation S630. A parameter corresponding to the confirmed driver version (operation S630) may be read from the prestored parameters at operation S640. On the other hand, in the case in which there is a transmitted parameter (reception determined at operation S620), the parameter may be read from the printing data at operation S660.

Next, the printing operation is preferably preformed according to the read parameter. Accordingly, the printing operation can be performed according to the parameter corresponding to the driver version. Further, in the case in which there is a color change according to a setting changed by a user, the user can perform the printing operation with a desired color (e.g., user set or modified).

Figure 7:
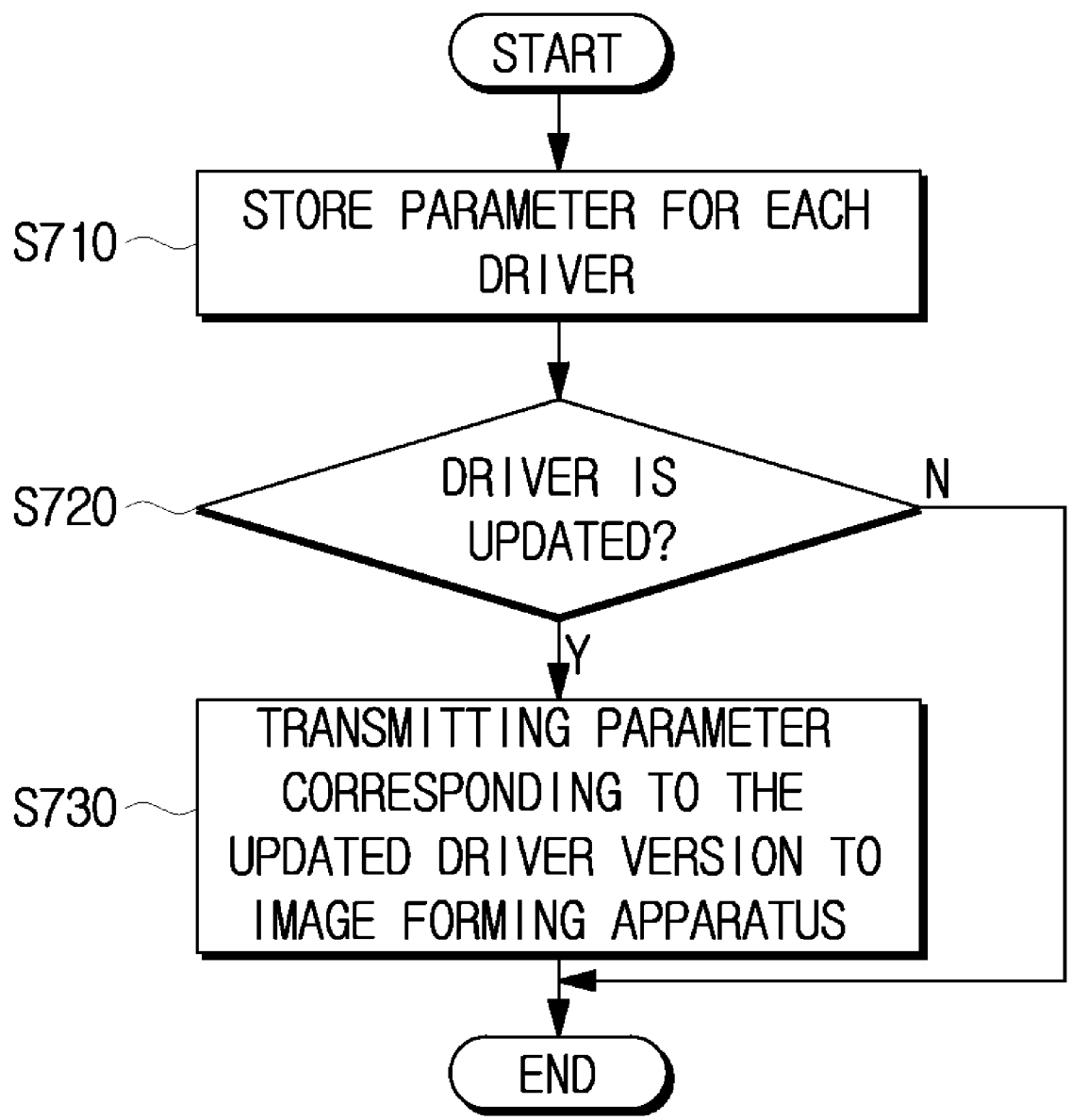
FIG. 7 is a flowchart illustrating a method of transmitting a parameter of a host device according to an exemplary embodiment of the present general inventive concept.

FIG. 7 is a flowchart illustrating a method of transmitting a parameter of a host device according to an exemplary embodiment of the present general inventive concept. As illustrated in FIG. 7, a parameter on a drive condition of the image forming apparatus is stored for each driver version at operation S710. If a driver is updated at operation S720, a parameter corresponding to the updated driver version is preferably transmitted to the image forming apparatus at operation S730.

Figure 8:
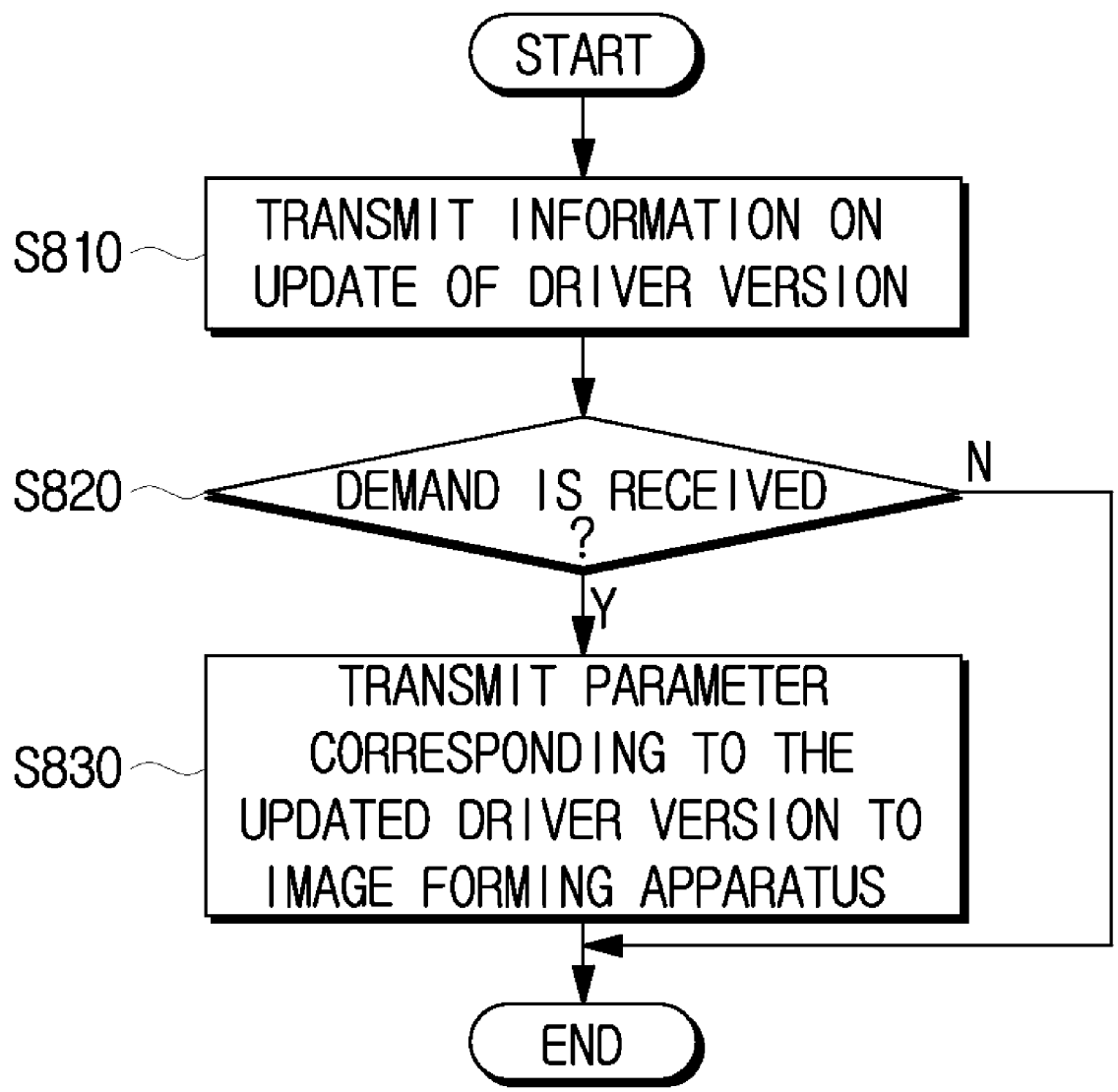
FIG. 8 is a flowchart illustrating a method of transmitting a parameter of a host device according to another exemplary embodiment of the present general inventive concept.

FIG. 8 is a flowchart illustrating a method of transmitting a parameter of a host device according to another exemplary embodiment of the present general inventive concept. FIG. 8 illustrates a method of transmitting a parameter when updating a driver of a host device. Information on an update of a driver version is transferred to an image forming apparatus at operation S810. If a demand signal on the transmitted update information is received from the image forming apparatus at operation S820, a parameter corresponding to the updated driver version may be transmitted to the image forming apparatus at operation S830. Operations of the exemplary method embodiment of FIG. 8 may be used for but are not intended to limit operation S730 of FIG. 7.

Figure 9:
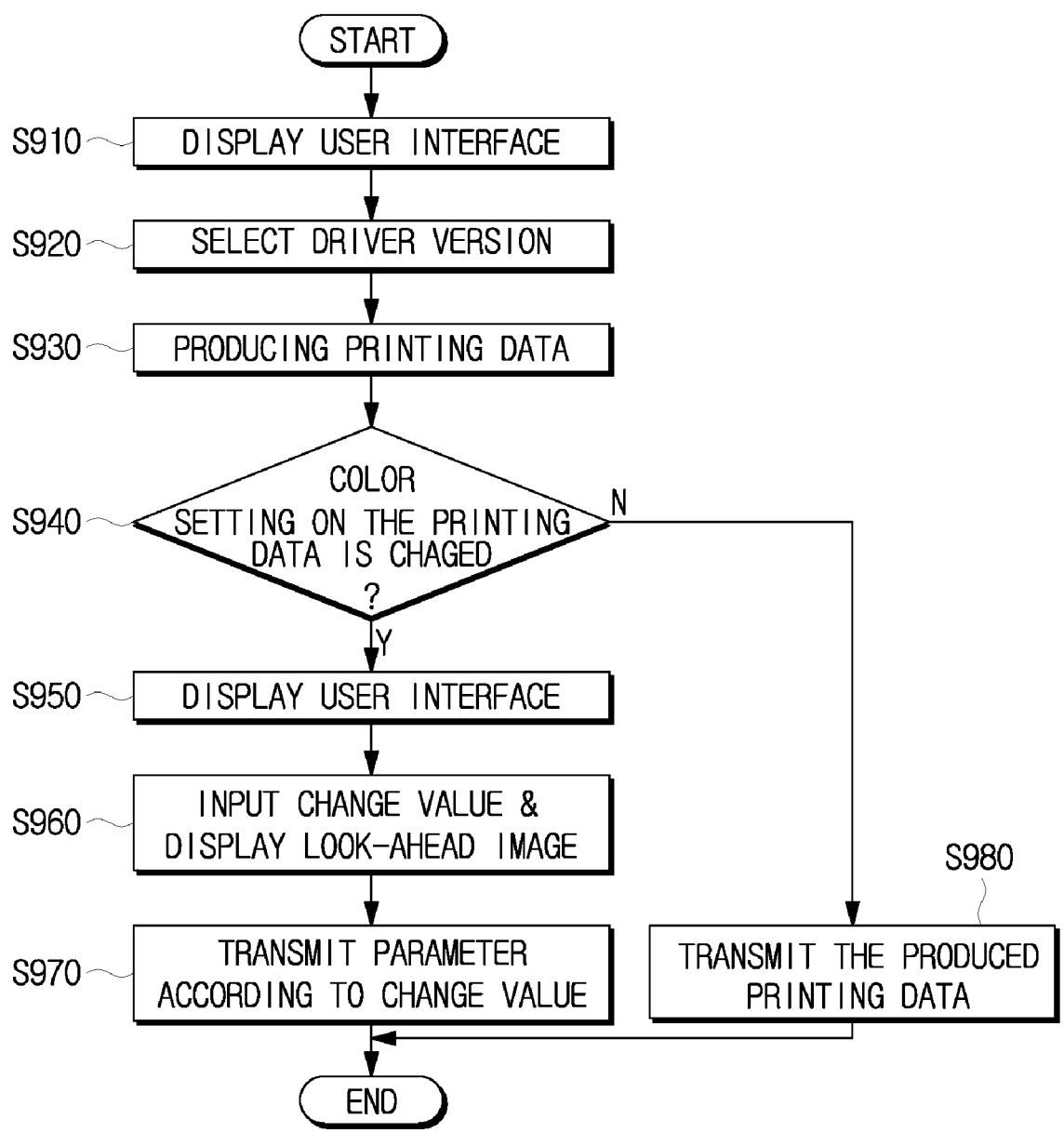
FIG. 9 is a flowchart illustrating a method of transmitting a parameter of a host device according to yet another exemplary embodiment of the present general inventive concept.

FIG. 9 is a flowchart illustrating a method of transmitting a parameter of a host device according to another exemplary embodiment of the present general inventive concept. As illustrated in FIG. 9, if a printing command is input from a user, a user interface for printing may be displayed at operation S910, and one of a plurality of prestored driver versions is selected and input at operation S920. Printing data are preferably produced according to the selected driver version at operation S930.

For example, the file to be produced is converted to printing data that can be read in the image forming apparatus according to the selected driver version (e.g., using an application program). During the conversion, the color may be converted from the RGB color to the CMYK color.

Whether there is a change command on color setting of the printing data can be confirmed at operation S940, and the produced printing data are transmitted to the host device if there is no change at operation S980.

On the other hand, if a change of color setting of the printing data is input from a user at operation S940, a user interface capable of modifying/verifying the converted CMYK color is preferably displayed at operation S950.

For example at operation S950, a user interface window may include a selection region providing density regulation ranges for C, M, Y, and K and a display region displaying a preview image of a printing output according to the change value if the change value is input in the selection region.

If the change value is input through the user interface window, the printing data with color converted according to the change value is preferably displayed through a preview image at operation S960. Then, the change value is one of the plurality of preset parameters.

If the change of color setting is completed, a parameter corresponding to the change value is transmitted to the image forming apparatus at operation S970. Accordingly, a changed color can be printed. Thus at operations S950-S970, conversion of the changed printing data may be performed.

As described above, apparatuses and methods according to the present general inventive concept may improve a printing quality. According to the present general inventive concept, a parameter corresponding to a driver version of a host device can be set by transmitting a parameter on a printing drive condition of an image forming apparatus whenever a driver version of the host device is updated.

Further, the printing color can be easily changed by regulating parameters for C, M, Y, K, and a wanted or desired color output can be realized by a user by performing a printing output using a parameter corresponding to the change, which can increase the satisfaction of the user.

The present general inventive concept can also be embodied as computer-readable codes on a computer-readable medium to execute the above-described method. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet) to transmit the computer-readable codes as a program. Also, functional programs, codes, and code segments to accomplish the present general inventive concept can be easily construed by programmers skilled in the art to which the present general inventive concept pertains.

As described above, selected functions were performed at the host device or the image forming apparatus. However, the present general inventive concept is not intended to be so limited as described capability or functions could be duplicated or moved between the host device (e.g., controller, user interface part) and image forming apparatus.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An image forming apparatus comprising:
   a printing part to perform a printing operation;
   a receiver to receive a parameter on a drive condition of the printing part from a host device;
   a storage part to store the parameter for each driver version;
   a controller to update the stored parameter according to the received parameter;
   a determiner to determine whether a parameter corresponding to an updated driver version is stored in the storage part when information on the updated driver version of the host device is received through the receiver; and
   a user interface part to select reception of the parameter corresponding to the updated driver version of the host device.

2. The image forming apparatus of claim 1,
   wherein the controller is configured to receive a parameter for the updated driver version from the host device and store the received parameter for the updated driver version in the storage part when the parameter corresponding to the updated driver version is determined not to exist as a result of the determination.

3. The image forming apparatus of claim 2,
   wherein the controller demands the parameter from the host device and stores the parameter received by the demand in the storage part if the reception of the parameter is selected through the user interface part.

4. The image forming apparatus of claim 1, wherein the controller confirms a driver version of the host device from received printing data and drives the printing part according to a parameter corresponding to the confirmed driver version when the printing data are received from the host device.

5. The image forming apparatus of claim 1, further comprising:
   a determiner to determine whether a parameter is included in printing data when the printing data is received from the host device,
   wherein the printing part is driven according to the included parameter when the parameter is determined to be included in the received printing data.

6. The image forming apparatus of claim 1, wherein the parameter is at least one of codes corresponding to transfer output voltage values, density regulation values, and amounts of consumed toner for C, M, Y, and K.

7. A host device including a driver of an image forming apparatus, comprising:
   a storage part to store a parameter corresponding to a driver version;
   a controller to update the parameter corresponding to the driver version in the storage part when a driver is updated and transmit a parameter corresponding to the updated driver version to the image forming apparatus; and
   a user interface part to input a change value for color setting of printing data,
   wherein the user interface part provides a user interface window comprising a selection region providing density regulation ranges for C, M, Y, and K and a display region displaying a preview image of a printing output according to the change value when the change value is input in the selection region.

8. The host device of claim 7, wherein the controller transmits update information to the image forming apparatus when the driver is updated and transmits the parameter corresponding to the updated driver version to the image forming apparatus when reception of the parameter corresponding to the updated driver version is demanded from the image forming apparatus.

9. The host device of claim 7,
   wherein the controller transmits a parameter corresponding to the change value to the image forming apparatus when the change value is input through the user interface part.

10. The host device of claim 7, wherein the parameter is at least one of codes corresponding to transfer output voltage values, density regulation values, and amounts of consumed toner for C, M, Y, and K.

11. A method of setting a parameter of an image forming apparatus, the method comprising:
    receiving a parameter on a printing drive condition from a host device;
    changing and setting a preset parameter to the received parameter;
    performing a printing operation according to the set parameter; and
    displaying a user interface window for selecting reception of the parameter corresponding to an updated driver version of the host device.

12. The method of claim 11, wherein the receiving of the parameter comprises:
    determining whether there is a parameter corresponding to an updated driver version in parameters prestored for driver versions in the image forming apparatus when information on an update of a driver version is received from the host device; and
    receiving a parameter for the updated driver version from the host device when the parameter corresponding to the updated driver version is not stored.

13. The method of claim 11, further comprising:
    confirming a driver version from printing data when the printing data is received from the host device; and
    reading a parameter corresponding to the confirmed driver version in the parameters prestored for driver versions,
    wherein the performing of the printing operation comprises performing the printing operation according to the read parameter.

14. The method of claim 11, wherein the parameter is at least one of codes corresponding to transfer output voltage values, density regulation values, and amounts of consumed toner for C, M, Y, and K.

15. A method of transmitting a parameter of a host device connected to an image forming apparatus, the method comprising:
    storing a parameter on a drive condition of the image forming apparatus for each driver version; and
    transmitting a parameter corresponding to an updated driver version to the image forming apparatus when a driver is updated; and
    displaying a user interface window for inputting a change value for color setting of printing data, wherein the user interface window comprises a selection region providing density regulation ranges for C, M, Y, and K and a display region displaying a preview image of a printing output according to the change value when the change value is input in the selection region.

16. The method of claim 15, wherein the transmitting of the parameter comprises:
    transmitting update information to the image forming apparatus;
    demanding reception of the parameter corresponding to the updated driver version by the image forming apparatus; and
    transmitting the parameter corresponding to the updated driver version to the image forming apparatus according to the demand.

17. The method of claim 15, further comprising:
    displaying a user interface window for selecting one of the stored driver versions; and
    producing printing data according to a selected driver version and transmitting the printing data to the image forming apparatus when the driver version is selected through the user interface window and a printing command is input.

18. The method of claim 15, further comprising:
    displaying a preview image of an output of the printing data according to the change value when the change value is input through the user interface window; and
    transmitting a parameter according to the change value to the image forming apparatus.

19. The method of claim 15, wherein the parameter on the drive condition is at least one of codes corresponding to transfer output voltage values, density regulation values, and amounts of consumed toner for C, M, Y, and K.

20. A printing system comprising:
    a host device including a storage part to store a parameter corresponding to a driver version, and a controller to update the parameter corresponding to the driver version in the storage part when a driver is updated and to transmit the parameter corresponding to the updated driver version; and
    an image forming apparatus including a printing part to perform a printing operation, a receiver to receive the parameter on a drive condition of the printing part from the host device, a storage part to store another parameter for each driver version, and a controller to update the stored another parameter according to the received parameter,
    wherein the host device comprises a user interface part to generate a user interface, and to receive data through the user interface according to the version condition.

21. The printing system of claim 20, wherein the host device automatically transmits the parameter when the controller updates the parameter corresponding to the driver version.

22. The printing system of claim 20, wherein:
    the image forming apparatus transmits a signal when communicating with the host device; and
    the host device transmits the parameter upon receiving the signal from the image forming apparatus.

23. The printing system of claim 20, wherein:
    the controller of the host device transmits the data and the parameter to the image forming apparatus; and
    the printing part of the image forming apparatus performs the printing operation of printing an image on a printing medium according to the data and the updated parameter.

* * * * *